United States Patent Office 3,540,210
Patented Nov. 17, 1970

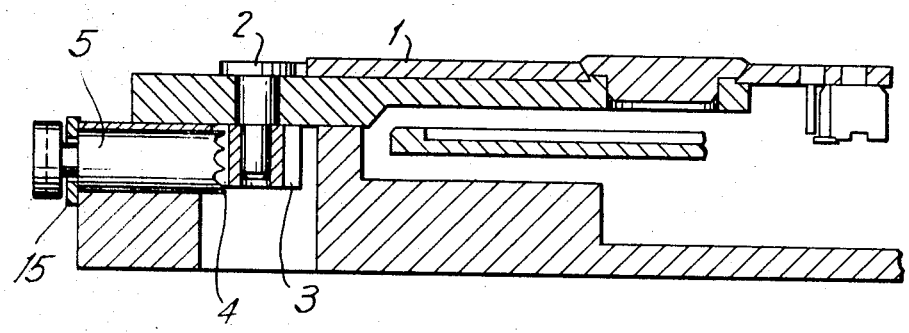
FIG. 2
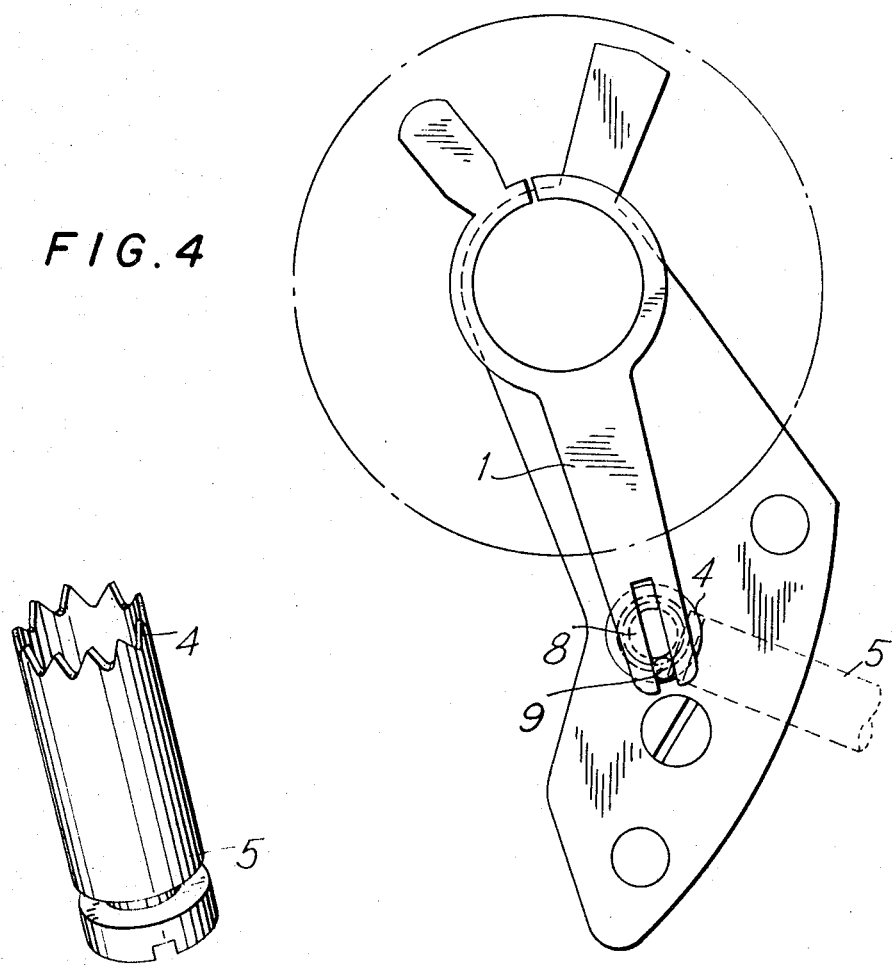
FIG. 4
FIG. 3

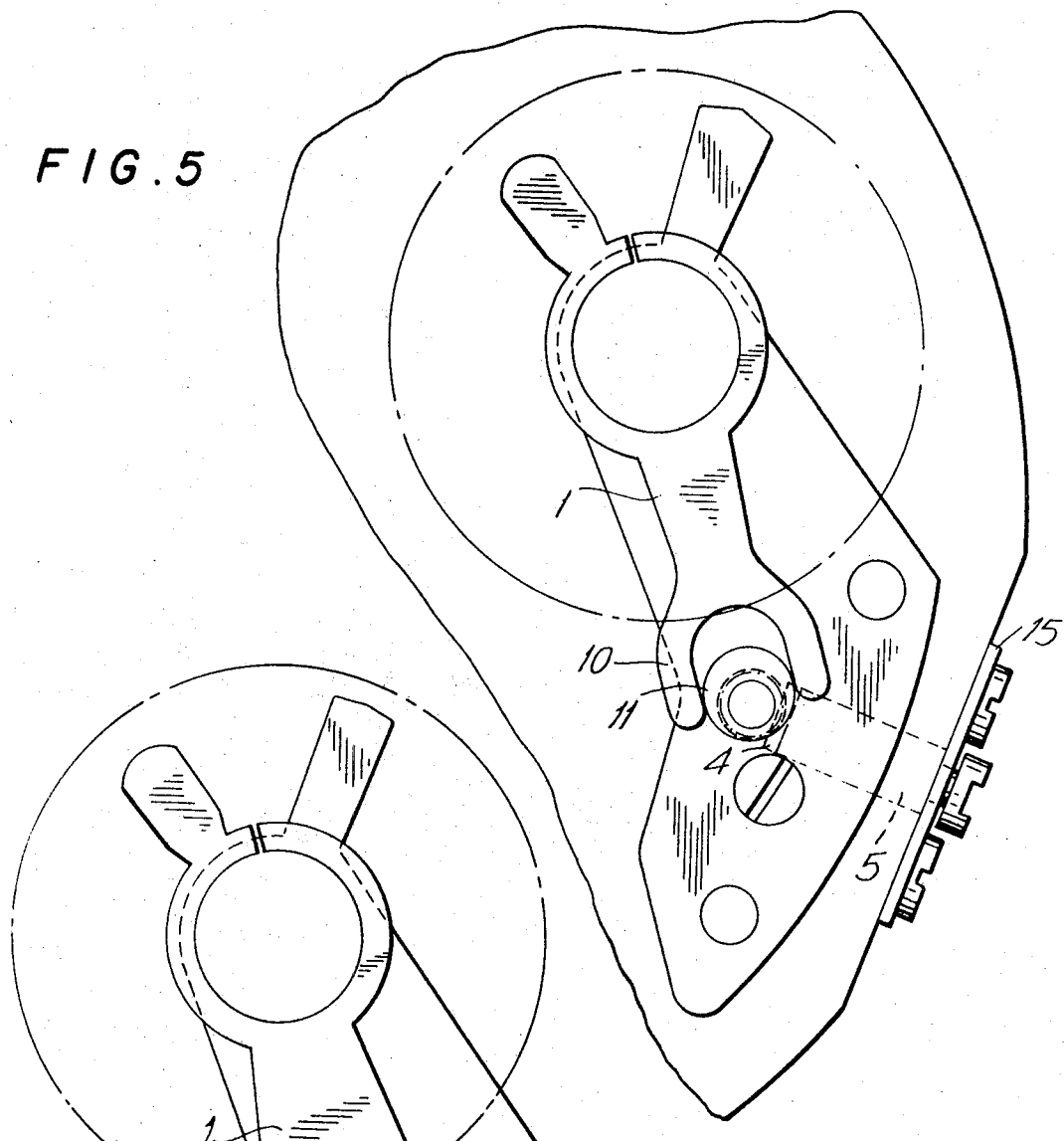
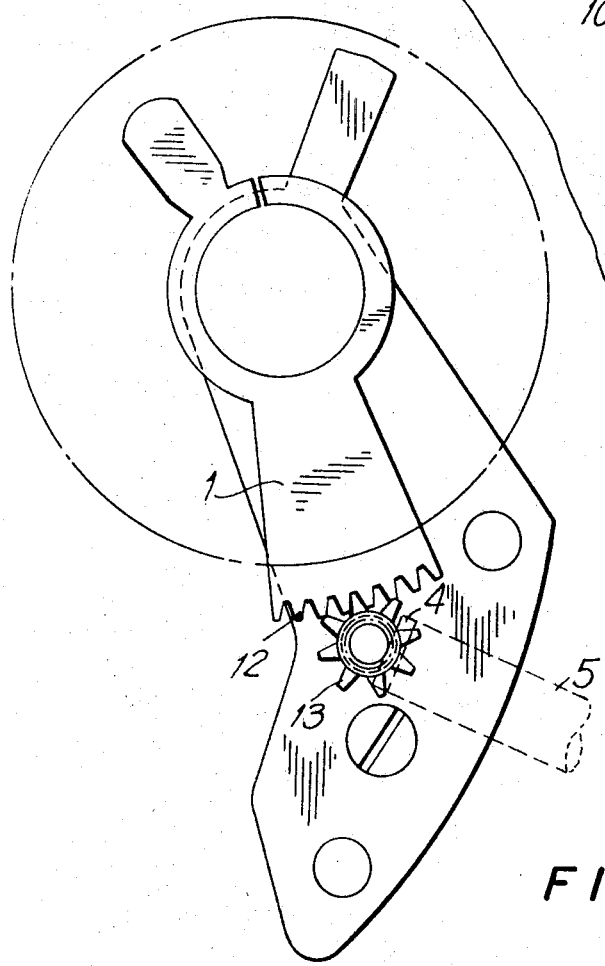

3,540,210
REGULATOR ADJUSTING DEVICE FOR WATCH
Toshiaki Saito and Yoshinori Futami, Suwa-shi, Japan, assignors to Kabushiki Kaisha Suwa Seikosha, Tokyo, Japan
Filed July 11, 1968, Ser. No. 744,113
Claims priority, application Japan, July 18, 1967, 42/45,800; July 28, 1967, 42/64,631; Feb. 28, 1968, 43/14,748
Int. Cl. G04b 17/14
U.S. Cl. 58—109                    14 Claims

ABSTRACT OF THE DISCLOSURE

An adjusting device for the regulator of a watch including a regulator shaft rotatably mounted within the watch and formed at one end with a driving means such as a face gear, worm or screw thread. Coupling means are provided between said driving means and said regulator for translating the rotation of said regulator shaft into rotation of said regulator. The watch also includes means for providing access to said regulator shaft for the selective rotation thereof.

BRIEF DESCRIPTION OF FIGURES

FIG. 2 is its cross section view of the embodiment of FIG. 1. FIG. 3 is a perspective view of the regulating shaft of FIG. 1 and FIGS. 4, 5, 6 and 7 are plane views showing second, third, fourth and fifth embodiments respectively.

DETAILED DESCRIPTION OF INVENTION

The present invention relates to a regulator adjusting means from the outside of a watch case. In the conventional watch, rate is adjusted by adjusting the regulator after opening the back cover. In these devices much time is required for rate adjustment and the waterproofness deteriorates due to the frequent opening and attaching of the back cover. As the use of water proof and one piece cases increases, the resultant inconvenience increases.

The present invention seeks to eliminate the above defects and adjust the regulator from the outside of the case, by means of the driver, without removing the back cover nor movement.

Figure 1:
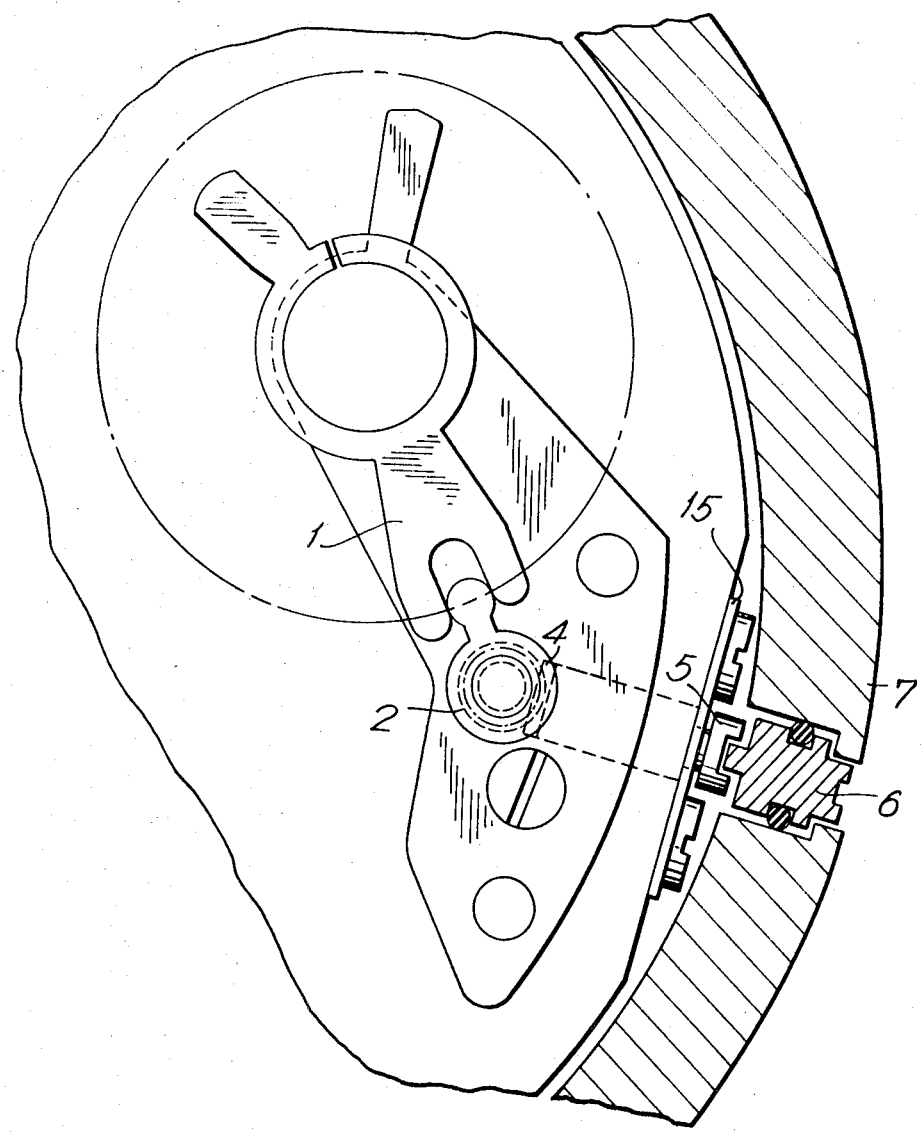
FIG. 1 is a plane view showing one embodiment of the invention by way of example.

Referring now to the drawings, FIGS. 1 and 2 shows a first embodiment of the arrangement according to the invention having regulator 1 having a fork shaped end. Regulating lever 2 is fixed on the regulating wheel 3 and engaged with the fork shaped part of the regulator by one end. As more particularly shown in FIG. 3, the watch is provided with a regulating shaft 5 formed at one end with a face gear 4, similar to the gear of the clutch wheel of the watch in engagement with the setting wheel. Said face gear at one end, with the regulating wheel at a right angle. Regulator adjusting pin 6 provided on the case 7, is formed with a groove at one end adapted to receive a driver such as a screwdriver, while the other end engages with a groove formed in the other end of regulating shaft 5. By rotating the regulator adjusting pin by means of the driver, regulating shaft 5, and therefore regulating wheel 3 turns to rotate the regulator. Thus the regulator can be adjusted from the outside of the case. Holder 15 is provided to receive and retain the regulator shaft.

FIG. 4 shows the second embodiment in which an eccentric pin 9 fixed on the regulating wheel engages with the fork shaped part 8 provided on the end of the regulator and the regulator 1 is adjusted by rotating the regulating shaft 5.

FIG. 5 shows the third embodiment of the invention in which an eccentric cam 11 is provided in place of the eccentric pin in the second embodiment and engages with the fork shaped end 10 of the regulator 1.

FIG. 6 shows the fourth embodiment of the invention in which a sector tooth 12 on the end of the regulator 1 engages with a regulating upper wheel 13 fixed on the regulating wheel. In this case the regulating wheel and regulating upper wheel may be in one body.

In the second, third and fourth embodiments, the regulating wheel and the regulating axis are in the same relation with each other as the corresponding elements in the first embodiment, and therefore the regulator can be adjusted by turning the regulating shaft.

Figures 7, 8:
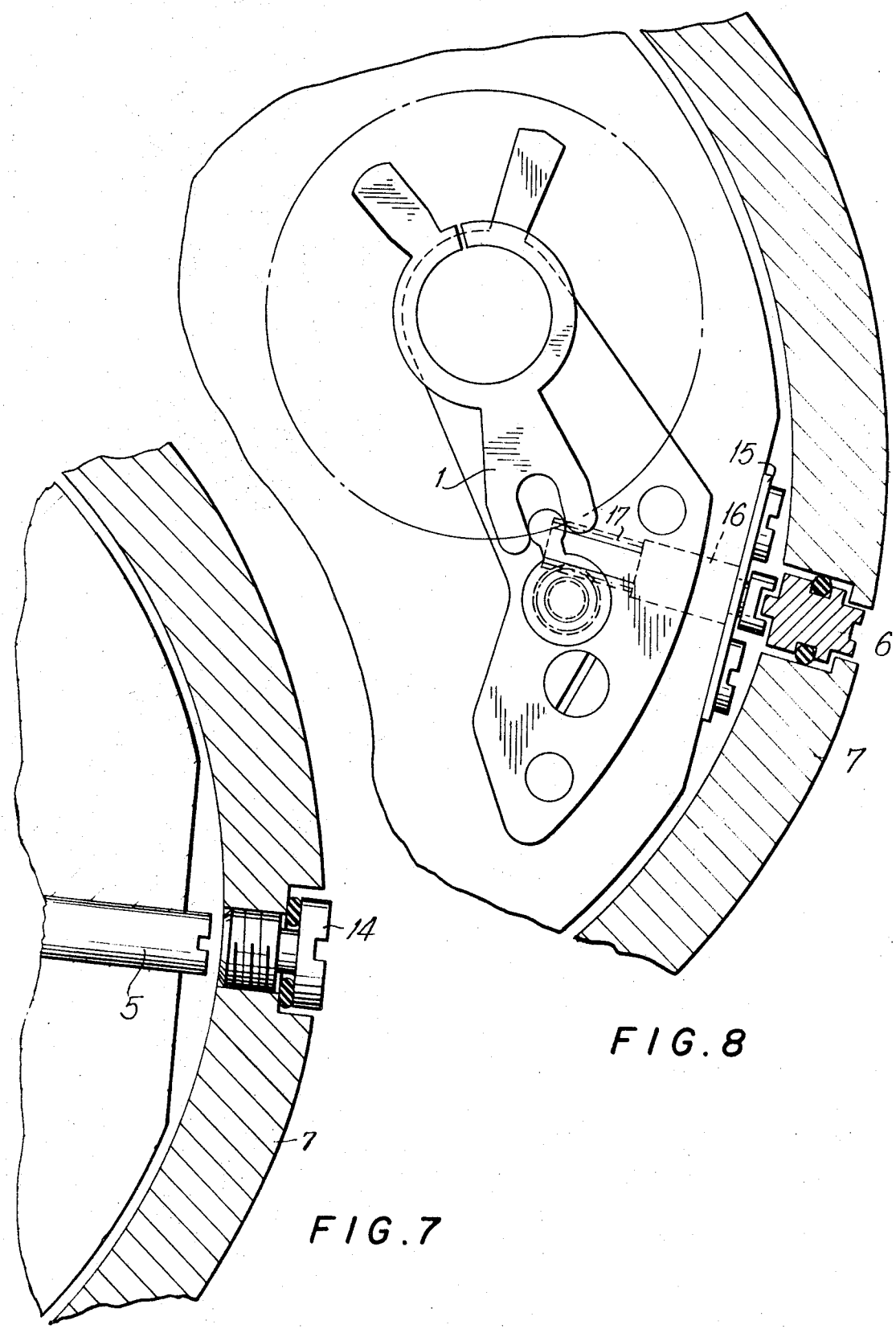
FIG. 8 is a plane view showing a sixth embodiment.

In the above embodiments the regulating axis is rotated through the regulator adjusting pin, but a small cover 14 may be provided on the case instead of the regulator adjusting pin, as is shown in FIG. 7. In this case the regulator is adjusted by removing the small cover and rotating the regulating axis directly by means of the driver. Holder 15 for the regulating axis in FIG. 1 is not indispensable. The face gear of the regulating axis may have a triangular tooth.

Figure 9:
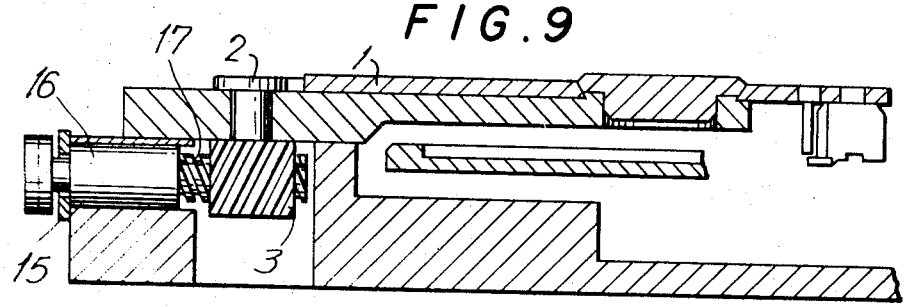
FIG. 9 is a cross section view thereof.

FIGS. 8 and 9 show the sixth embodiment in which the regulating shaft 16 is formed with worm 17 on one end thereof in engagement with the regulating wheel 3. By rotating the regulating shaft by means of the regulator adjusting pin, the regulating wheel rotates and then rotates the regulator. Thus, as in the first embodiment the regulator can be adjusted from the outside by rotating the regulator adjusting pin by means of the driver.

In the second, third, fourth and fifth embodiments, the regulator can be also adjusted from the outside by replacing the face gear of the regulating shaft by the worm of FIG. 8.

Figure 10:
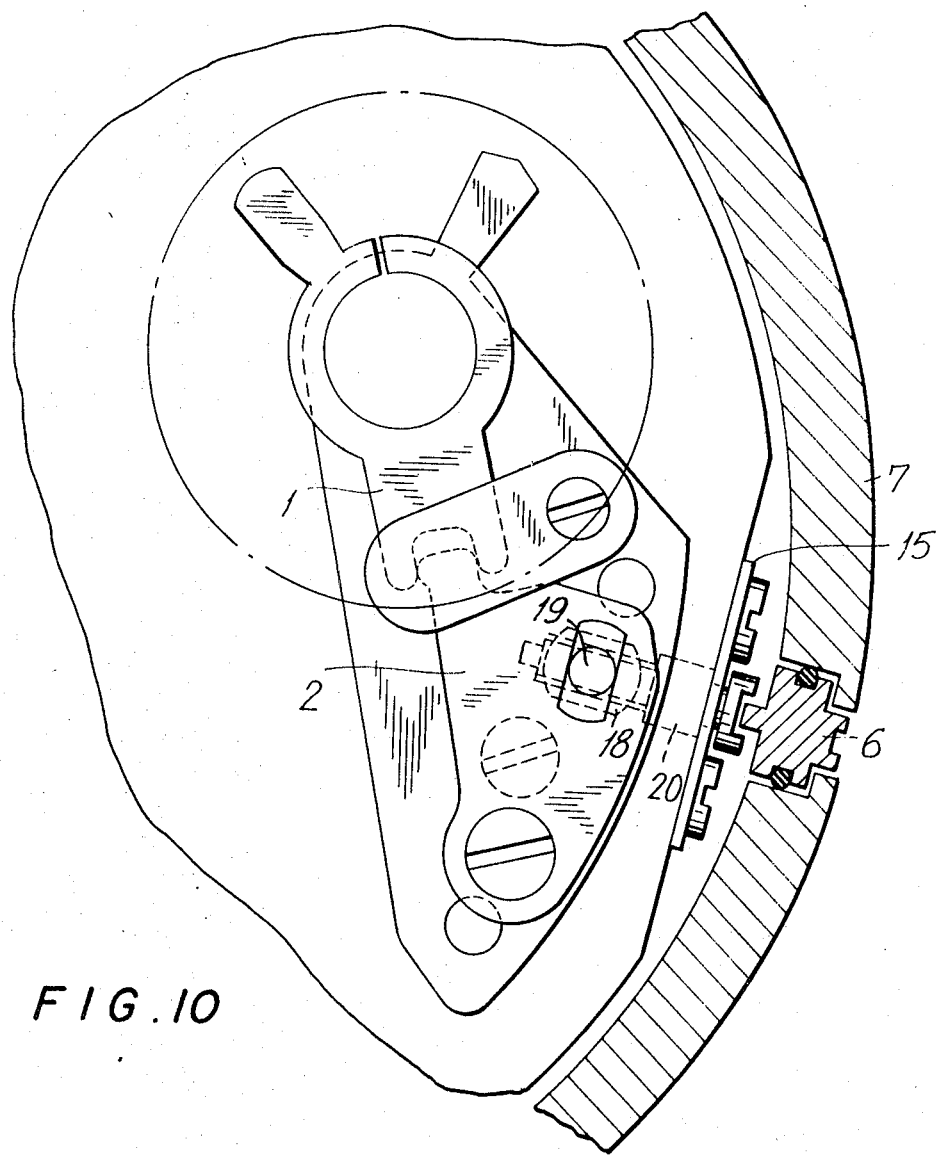
FIG. 10 is a plane view showing seventh embodiment.
Figure 11:
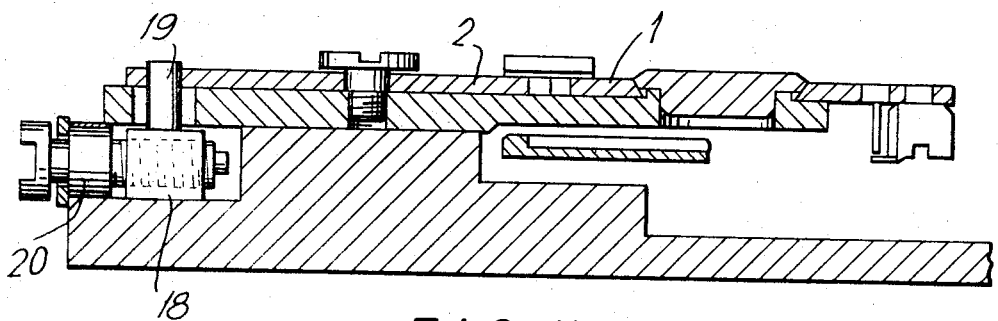
FIG. 11 is a cross section view thereof.

FIGS. 10 and 11 show the seventh embodiment in which sliding member 18 is disposed within a groove in the frame of the watch for displacement therealong. Said sliding member is formed with a projecting portion 19 which engages with the regulating lever 2 and an internal thread which engages with a screw 20 formed on one end of said regulating shaft.

By rotating the regulating shaft through the regulator adjusting pin the sliding member moves along the groove of the frame in the axial direction of the regulating screw. This rotates the regulating lever to rotate the regulator. Thus the regulator can be adjusted from the outside.

As can be seen in FIG. 6 the end of the regulator may be a sector wheel with which a part of the regulating lever forming a sector wheel engages.

Figure 12:
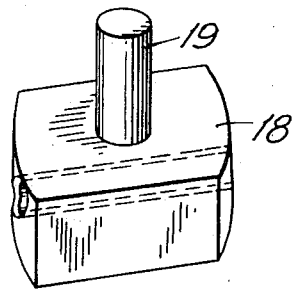
FIG. 12 is a perspective view showing one embodiment of the sliding member of FIG. 10.
Figure 13:
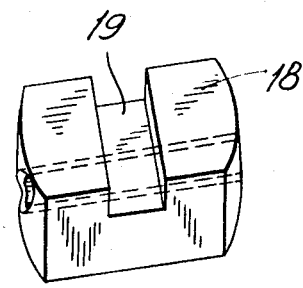
FIG. 13 is a perspective view showing another embodiment of said sliding member.
Figure 14:
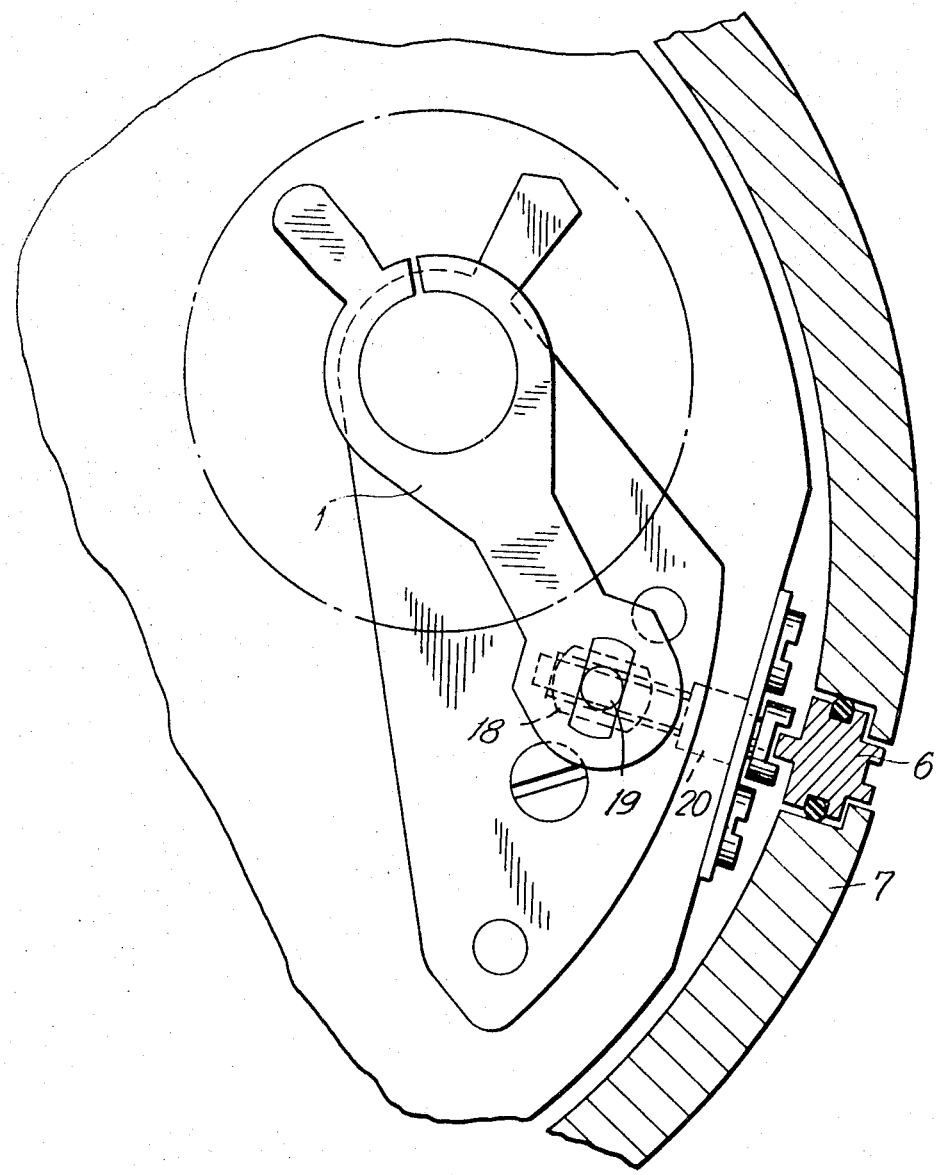
FIG. 14 is a plane view showing the eighth embodiment.

FIG. 12 is a perspective view of one embodiment of the sliding member 18. As is shown in FIG. 13, a groove may be provided on the sliding member for engagement with a corresponding projection in the regulating lever. FIG. 14 is a plane view showing the eighth embodiment in which the regulator and the sliding member 18 are in direct engagement without an intermediary piece. In the seventh embodiment the regulating lever rotates but it may also slide in the groove.

In all embodiments of the present invention the regulator may be constructed in one piece or two pieces. In case of two pieces, adjustment by rotating the regulating axis can be applied only for the microadjustment.

The present invention as described above, is very convenient for use in a waterproof case wherein the back cover is not easy to be removed, or in a one piece watch in which the back cover is not separated from the case body and the movement must be taken out from the dial side. The arrangement is also very convenient to protect the case from dust and does not take much space. The number of parts required is not large. Microadjustment can be done when the worm gear system or screw system is used.

What we claim is:

1. Adjusting means for a watch regulator comprising an adjusting shaft mounted for rotation within said watch and formed with a driving element, said watch regulator being formed with a slotted portion, coupling means interconnecting said driving element and said slotted portion of said regulator to rotate said regulator in response to the rotation of said adjusting shaft; a case for said watch; and means providing access through said case to said adjusting shaft for the selective rotation thereof.

2. Adjustment means as recited in claim 1, wherein said case is provided with an aperture therethrough substantially aligned with said adjusting shaft, said means for providing access to said adjusting shaft including an adjusting pin rotatably mounted in said aperture in engagement with said adjusting shaft whereby said adjusting shaft may be operatively rotated by rotating said adjusting pin.

3. Adjusting means as recited in claim 1, wherein said case is provided with an aperature therethrough substantially aligned with said adjusting shaft, said means for providing access to said adjusting shaft including a cover removably mounted in said aperture whereby, upon removal of said cover, access is provided to said adjusting shaft for the selective rotation thereof.

4. Adjusting means as recited in claim 1, wherein said driving element of said regulating shaft comprises a face gear formed in one end of said adjusting shaft, said coupling means including a regulating wheel gear rotatably mounted in operative engagement with said adjusting shaft face gear for rotation thereby.

5. Adjusting means as recited in claim 4, including a regulating lever fixed to said regulating wheel gear for rotation therewith, a portion of said regulating lever engaging said regulator within said slot for the rotation of said regulator in response to the rotation of said regulating wheel gear and adjusting shaft.

6. Adjusting means as recited in claim 4, including a pin eccentrically mounted on the side of said regulating wheel gear for rotation therewith, said pin being positioned to ride in said slotted portion of said regulator for the rotation of said regulator in response to the rotation of said regulating wheel gear and adjusting shaft.

7. Adjusting means as recited in claim 4, including an eccentric cam mounted on said regulating wheel gear for rotation therewith, said eccentric cam being disposed in the slotted portion of said regulator for the rotation of said regulator in response to the rotation of said regulating wheel gear and adjusting shaft.

8. Adjusting means as recited in claim 1, wherein said driving element of said adjusting shaft comprises a worm gear, said coupling means including a regulating wheel gear rotatably mounted in operative engagement with said worm gear for rotation in response to the rotation of said adjusting shaft.

9. Adjusting means as recited in claim 8, including a regulating lever fixed to said regulating wheel gear for rotation therewith, a portion of said regulating lever engaging said regulator within said slotted portion for the rotation of said regulator in response to the rotation of said regulating wheel gear and adjusting shaft.

10. Adjusting means as recited in claim 8, including a pin eccentrically mounted on the side of said regulating wheel gear for rotation therewith, said pin being positioned to ride in said slotted portion of the regulator for the rotation of said regulator in response to the rotation of said regulating wheel gear and adjusting shaft.

11. Adjusting means as recited in claim 8, including an eccentric cam mounted on said regulating wheel gear for rotation therewith, said eccentric cam being disposed in the slotted portion of said regulator for the rotation of said regulator in response to the rotation of said regulating wheel gear and adjusting shaft.

12. Adjusting means as recited in claim 1, including a frame formed with a guide groove therein, said coupling means including a sliding member disposed in said guide groove for longitudinal displacement therealong, said sliding member being formed with a threaded bore therethrough, said driving means portion of said regulating shaft comprising a threaded peripheral surface thereof disposed within said sliding member threaded bore in operative engagement therewith, said coupling means further including translating means for translating the longitudinal displacement of said sliding member in response to the rotation of said regulating shaft into the rotation of said regulator.

13. Adjusting means as recited in claim 12, wherein said translating means includes a pin projecting from said sliding member and a pivotably mounted lever operatively engaged by said pin for pivoting in response to the longitudinal displacement of said sliding member and operatively engaging the slotted portion of said regulator for rotation thereof in response to the pivoting of said lever.

14. Adjusting means as recited in claim 12, wherein said sliding member is formed with a groove in the surface thereof, said translating means including a pivotably mounted lever operatively engaging the slotted portion of said regulator for the rotation thereof in response to the pivoting of said lever, and a pin extending from said lever and riding in said groove for pivoting said lever in response to the displacement of said sliding member.

References Cited

UNITED STATES PATENTS

| | | | |
|---|---|---|---|
| 1,835,391 | 12/1931 | Haefliger | 58—109 |
| 2,441,847 | 5/1948 | Semon | 58—109 |
| 2,645,077 | 7/1953 | Olson | 58—109 X |

FOREIGN PATENTS

| | | |
|---|---|---|
| 247,759 | 12/1947 | Switzerland. |
| 336,008 | 3/1959 | Switzerland. |
| 355,739 | 8/1961 | Switzerland. |

RICHARD B. WILKINSON, Primary Examiner

S. A. WAL, Assistant Examiner